United States Patent
Chien

(10) Patent No.: US 11,061,352 B2
(45) Date of Patent: Jul. 13, 2021

(54) IMAGE FORMING APPARATUS HAVING A COMMON DISCHARGE PART FOR DISCHARGING A SHEET WITH AN IMAGE FORMED BY AN IMAGE FORMING UNIT AND A DOCUMENT AFTER READING BY AN IMAGE READING UNIT

(71) Applicant: KYOCERA Document Solutions Inc., Osaka (JP)

(72) Inventor: Nguyen Danh Chien, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/920,123

(22) Filed: Jul. 2, 2020

(65) Prior Publication Data

US 2021/0011415 A1    Jan. 14, 2021

(30) Foreign Application Priority Data

Jul. 8, 2019  (JP) .............................. JP2019-126857

(51) Int. Cl.
  *G03G 15/00*   (2006.01)
  *H04N 1/00*   (2006.01)

(52) U.S. Cl.
  CPC ........... *G03G 15/602* (2013.01); *G03G 15/50* (2013.01); *G03G 15/6552* (2013.01); *G03G 15/6573* (2013.01); *H04N 1/00588* (2013.01)

(58) Field of Classification Search
  CPC ............. G03G 15/602; G03G 15/6552; G03G 15/6573; G03G 15/50; H04N 1/00588
  See application file for complete search history.

(56) References Cited

U.S. PATENT DOCUMENTS

2007/0134036 A1    6/2007  Sato et al. .................... 399/367

FOREIGN PATENT DOCUMENTS

| JP | 06343118 A | * | 12/1994 |
| JP | 11-41408 A | | 2/1999 |
| JP | 2005-277590 A | | 10/2005 |
| JP | 2007-159022 A | | 6/2007 |

* cited by examiner

*Primary Examiner* — Susan S Lee
(74) *Attorney, Agent, or Firm* — Stein IP, LLC

(57) ABSTRACT

An image forming apparatus includes a sheet feeding part, a sheet conveying path, an image forming unit, a document feeding part, a document conveying path, an image reading unit, and a common discharge part. The sheet conveying path extends from the sheet feeding part to a downstream side in the sheet conveying direction. The image forming unit is disposed on the sheet conveying path. The document feeding part is disposed at a different position from the sheet feeding part, to send out a document. The document conveying path extends from the document feeding part to a downstream side in the document conveying direction. The image reading unit is disposed on the document conveying path. The common discharge part is disposed at a junction of the sheet conveying path and the document conveying path, to discharge the sheet after image formation and the document after reading.

9 Claims, 5 Drawing Sheets

IMAGE FORMING APPARATUS HAVING A COMMON DISCHARGE PART FOR DISCHARGING A SHEET WITH AN IMAGE FORMED BY AN IMAGE FORMING UNIT AND A DOCUMENT AFTER READING BY AN IMAGE READING UNIT

INCORPORATION BY REFERENCE

This application is based upon and claims the benefit of priority from the corresponding Japanese Patent Application No. 2019-126857 filed Jul. 8, 2019, the entire contents of which are hereby incorporated by reference.

BACKGROUND

The present disclosure relates to an image forming apparatus that forms an image on a recording medium, and particularly to an image forming apparatus having an image reading function for reading a document image.

Conventionally, the image forming apparatus having the image reading function is widely used. A copier is an apparatus integrally including an image reading device that obtains image data by scanning an image of a document placed on a document table using a reading optical system, and an image forming apparatus for outputting an image based on the image data onto a recording medium, so that the document image read by the image reading device is output by the image forming apparatus. Further, the same process as in the copier can be performed by using a combination of the image reading device and the image forming apparatus, which function independently of each other.

For instance, there are known an image reading device and an image forming apparatus having a reading function, in each of which a plurality of placement positions are disposed for placing a document, a process to be performed on an image by a processing unit is set for each placement position, and a control unit is disposed for controlling the processing unit so that the process corresponding to the placement position is performed on the image read by the reading unit.

Further, there is known an image forming apparatus having a reading function, in which a feed cassette, a paper sheet discharge tray, a document discharge tray, and a document placement tray are disposed in this order from bottom to top in such a manner that longitudinal directions thereof are in the front and back direction of an apparatus main body, a side wall of a casing is positioned on each of both sides in the width direction of the trays and the cassette to cover the height of the casing, and the entire apparatus is formed in a box shape.

Further, there is known an image forming apparatus including two sheet conveying paths disposed after a sheet feed path from one sheet feed tray via a sheet switching unit, and one of the sheet conveying paths in which a printing unit is disposed and the other sheet conveying path in which a reading unit is disposed join and reach a common discharge port.

SUMMARY

An image forming apparatus according to one aspect of the present disclosure includes a sheet feeding part, a sheet conveying path, an image forming unit, a document feeding part, a document conveying path, an image reading unit, and a common discharge part. The sheet feeding part sends out a sheet. The sheet conveying path extends from the sheet feeding part to a downstream side in a sheet conveying direction. The image forming unit is disposed on the sheet conveying path and forms an image on a sheet. The document feeding part is disposed at a position different from that of the sheet feeding part and sends out a document. The document conveying path extends from the document feeding part to a downstream side in a document conveying direction. The image reading unit is disposed on the document conveying path and reads a document. The common discharge part is disposed at a junction of a downstream side end of the sheet conveying path in the sheet conveying direction and a downstream side end of the document conveying path in the document conveying direction, so as to discharge the sheet with the image formed by the image forming unit and the document after reading by the image reading unit.

Other objects of the present disclosure and specific advantages obtained by the present disclosure will become more apparent from the description of the embodiment given below.

DETAILED DESCRIPTION

Figure 1:
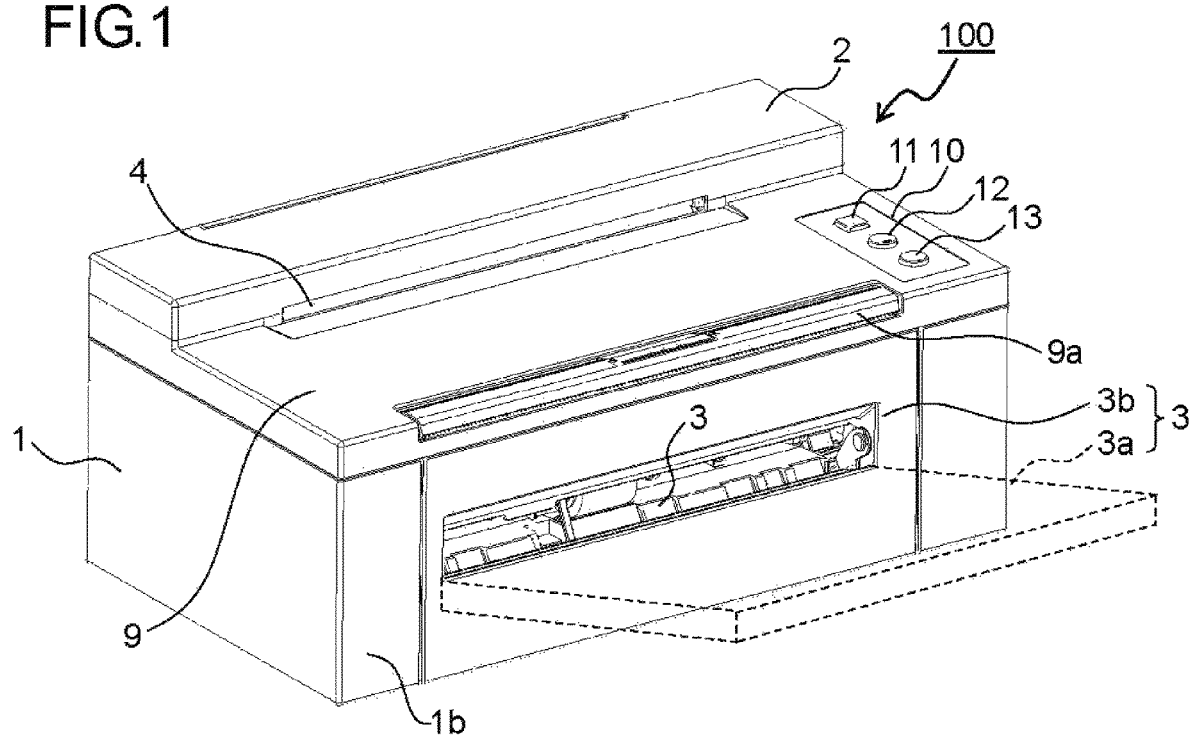
FIG. 1 is an external perspective view of an image forming apparatus according to one embodiment of the present disclosure, viewed from the front side.
Figure 2:
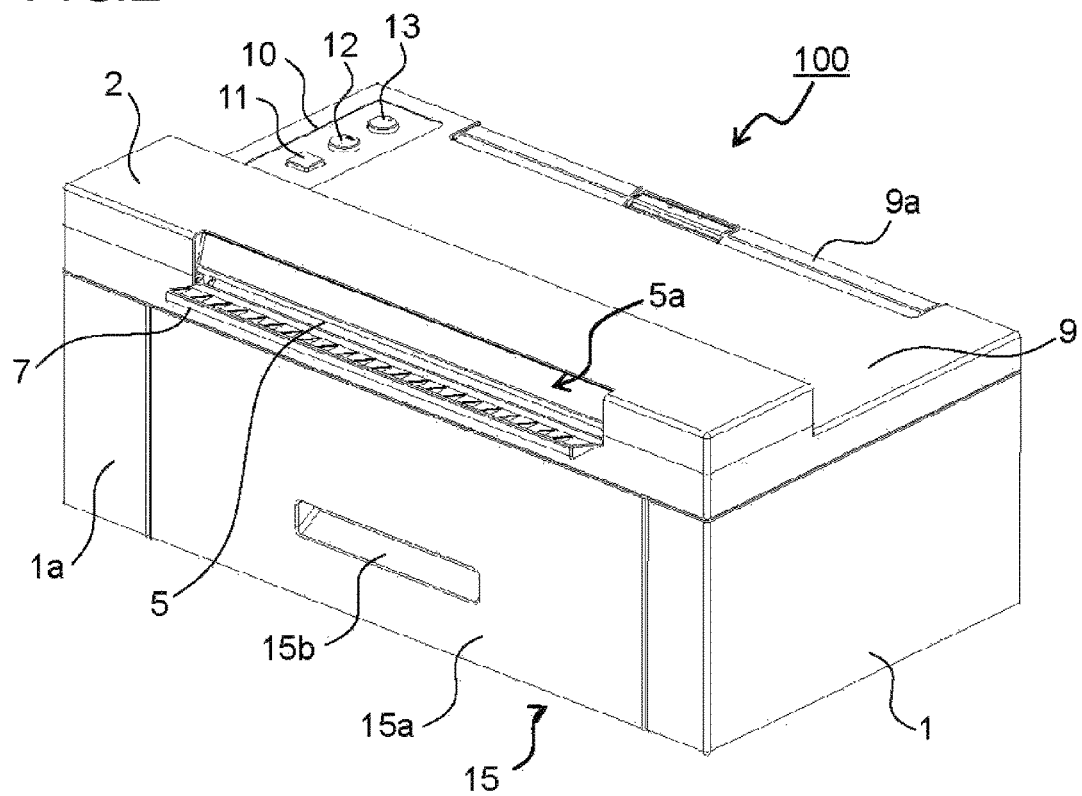
FIG. 2 is an external perspective view of the image forming apparatus of this embodiment, viewed from the back side.
Figure 3:
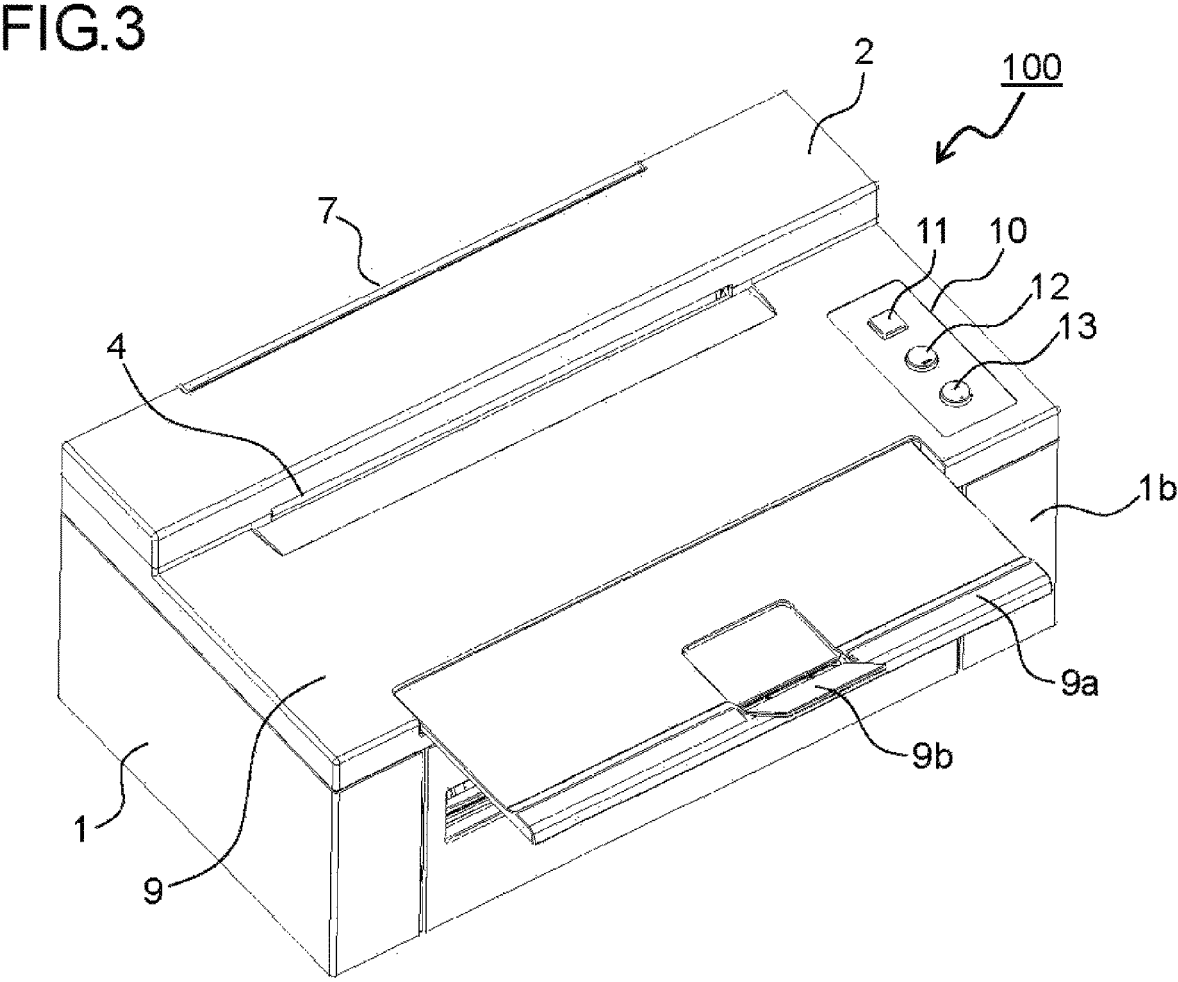
FIG. 3 is an external perspective view of the image forming apparatus of this embodiment, viewed from above, which shows a state where an auxiliary tray is pulled out.

Hereinafter, with reference to the drawings, an embodiment of the present disclosure is described. FIGS. 1 and 2 are external perspective views of an image forming apparatus 100 of one embodiment of the present disclosure, viewed from the front side and the back side, respectively. FIG. 3 is an external perspective view of the image forming apparatus 100 viewed from above, illustrating a state where an auxiliary tray 9a is pulled out. The image forming apparatus 100 is a so-called monochrome multifunction peripheral having a copy function, a printer function, and a scanner function, and it is made up of a main body 1 (printing unit) and a scanner unit 2 disposed on the upper part of the main body 1.

The main body 1 is equipped with a paper feeding part (sheet feeding part) 3 that feeds a paper sheet (a sheet), an image forming unit P that forms a toner image (a monochrome image) on the paper sheet by charging, exposing, developing, and transferring processes, a fixing device 32 for fixing the toner image on the paper sheet (see FIG. 4 for them), a discharge part (a common discharge part) 4 for conveying and discharging the paper sheet after the fixing process from the main body 1, and the like. The main body 1 has a rectangular parallelepiped shape including a first side surface 1a forming the back side of the main body 1 and a second side surface 1b disposed opposite to the first side surface 1a so as to form the front side of the main body 1.

The paper feeding part 3 includes a sheet feed tray 3a (shown by a broken line in FIG. 1) on which paper sheets are placed, and a paper feed port 3b connected to the sheet feed tray. The paper feeding part 3 feeds the paper sheets placed on the sheet feed tray 3a one by one after separating one paper sheet from the others. The paper feeding part 3 is disposed at a lower part of the second side surface 1b.

The scanner unit 2 is equipped with a document feeding part 5 for entering a sheet-like document, a reading module 37, a reading glass 38 (see FIG. 4 for them), and the like. The document feeding part 5 has a document insertion slot 5a, and an openable and closable cover 7 is provided to the document insertion slot 5a. In order to perform a reading operation of a document, the openable and closable cover 7 is opened as shown in FIG. 2, and the document is inserted into the document insertion slot 5a. The document feeding part 5 is disposed at the upper part of the first side surface 1a.

On the upper surface of the main body 1, a discharge tray 9 is disposed for receiving and stacking paper sheets (or document sheets) discharged from the discharge part 4. Further, an auxiliary tray 9a is disposed at a front side end of the discharge tray 9. The auxiliary tray 9a is selectively positioned at a position stowed in the discharge tray 9 (a first position) as shown in FIGS. 1 and 2, and at a position pulled out from the discharge tray 9 to the downstream side in a discharging direction (a second position) as shown in FIG. 3. At a distal end of the auxiliary tray 9a, a foldable stopper 9b is disposed for preventing the discharged paper sheet (or document sheet) from dropping. The discharge part 4 is disposed between the first side surface 1a and the second side surface 1b on the upper surface of the main body 1, and the discharge tray 9 constitutes a part of the upper surface of the main body 1.

On the upper surface of the main body 1, an operation panel (input unit) 10 is disposed at one end side (the right side in FIG. 1) in a width direction (in the left and right direction in FIG. 1). The operation panel 10 includes a power switch 11 for turning on and off the image forming apparatus 100, a print switch 12 for reading (scanning) a document and forming an image, and a scan switch 13 for performing only reading of a document.

A process unit 15 is mounted on the back side of the main body 1. The process unit 15 includes a unit side surface 15a that forms a part of the back surface (external surface) of the main body 1 together with the first side surface 1a. The unit side surface 15a is provided with a grip portion 15b for gripping when the process unit 15 is attached or detached.

Figure 4:
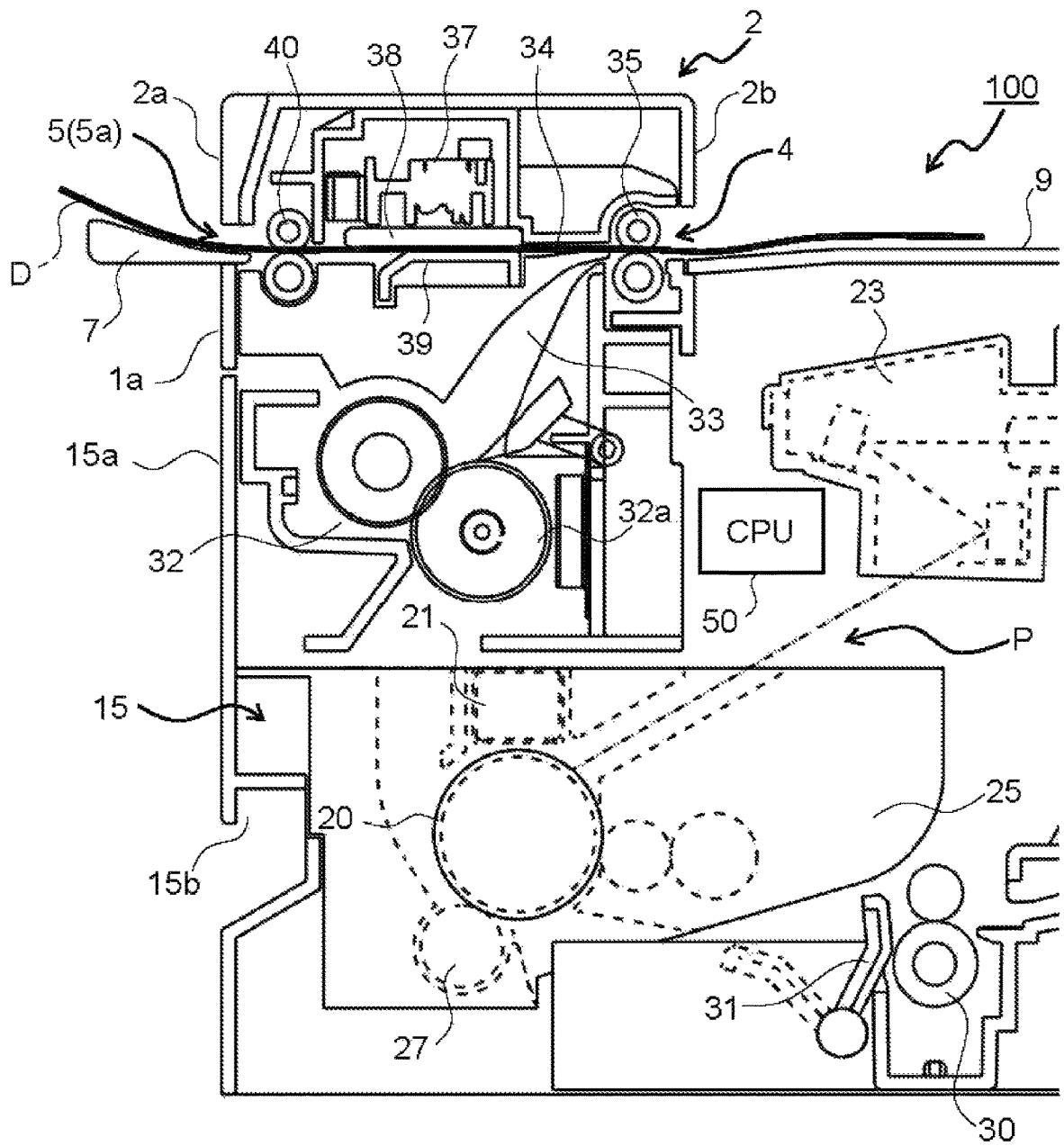
FIG. 4 is a cross-sectional side view of the image forming apparatus of this embodiment, including an image forming unit and a scanner unit, illustrating a situation where a document is being read by a reading module.

FIG. 4 is a cross-sectional side view of the image forming apparatus 100 of this embodiment. Inside the main body 1, the image forming unit P is disposed, which includes a photosensitive drum 20, a charging device 21, an exposing device (such as a laser scanning unit) 23, a developing device 25, a transfer roller 27, and a cleaning device (not shown).

A registration roller pair 30 and a registration sensor 31 are disposed on the downstream side of the paper feeding part 3 (see FIG. 1) and on the upstream side (the right side in FIG. 4) of the image forming unit P in the paper sheet conveying direction. The registration sensor 31 detects timing when the paper sheet, which is fed from the paper feeding part 3 and stops at the registration roller pair 30, is reconveyed by the registration roller pair 30.

Above the image forming unit P, the fixing device 32 and a control unit 50 are disposed. The fixing device 32 includes a fixing roller pair 32a made up of a fixing roller and a pressure roller. The control unit 50 controls operations of the image forming unit P and the scanner unit 2 on the basis of an input signal from the operation panel 10 (see FIG. 1). Between the paper feeding part 3 (see FIG. 1) and the discharge part 4, a paper sheet conveying path 33 is formed to extend substantially horizontally from the second side surface 1b (the right side in FIG. 4) toward the first side surface 1a, curve upward along the first side surface 1a, and curve toward the second side surface 1b again, in a C-shape viewed from the side face. A discharge roller pair 35 is disposed in the discharge part 4.

Inside the scanner unit 2, a document conveying path 34 is formed to extend substantially horizontally between the document feeding part 5 and the discharge part 4. Along this document conveying path 34, the reading module (image reading unit) 37, the reading glass 38, and an opposing member 39 are disposed. The document feeding part 5 includes a feed roller pair 40 for feeding a document D. The scanner unit 2 has a first side plate 2a located above the first side surface 1a and a second side plate 2b facing the first side plate 2a on the second site surface 1b side (the right side of FIG. 4). The document feeding part 5 is disposed in the first side plate 2a. The paper feeding part 3 is disposed in the second side plate 2b. The discharge part 4 is disposed on the upper surface below the second side plate 2b.

The reading module 37 is an image reading device of a CIS sensor (contact image sensor) type, and is disposed to contact the back surface of the reading glass 38. Inside the reading module 37, provided are a light source, a condensing lens made up of a plurality of lenses, and a complementary MOS (CMOS) sensor as a reading unit (which are not shown). Light emitted from the light source is reflected by the document D, condensed by the condensing lens, and guided to the CMOS sensor.

The opposing member 39 is disposed to face the reading glass 38 with the document conveying path 34 therebetween. The opposing member 39 forms a part of the inner surface of the document conveying path 34 together with the reading glass 38 and works as a white reference plate for shading correction of the reading module 37.

Next, an image forming operation by the image forming apparatus 100 of this embodiment is described. First, as shown in FIG. 4, the open able and closable cover 7 is opened, and a front end of the document D is inserted into the document insertion slot 5a along the upper surface (inner surface) of the openable and closable cover 7. In this state, the print switch 12 on the operation panel 10 is pressed. Then, the feed roller pair 40 rotates based on a control signal from the control unit 50, and the document D is conveyed to the reading glass 38. At this timing, the light from the light source in the reading module 37 illuminates the surface of the document D, and image light reflected by the image surface forms an image on the CMOS sensor, so that reading of the image is performed. The read image signal is converted into a digital signal, and then stored as document image data in a storage unit (not shown) in the control unit 50.

Figure 5:
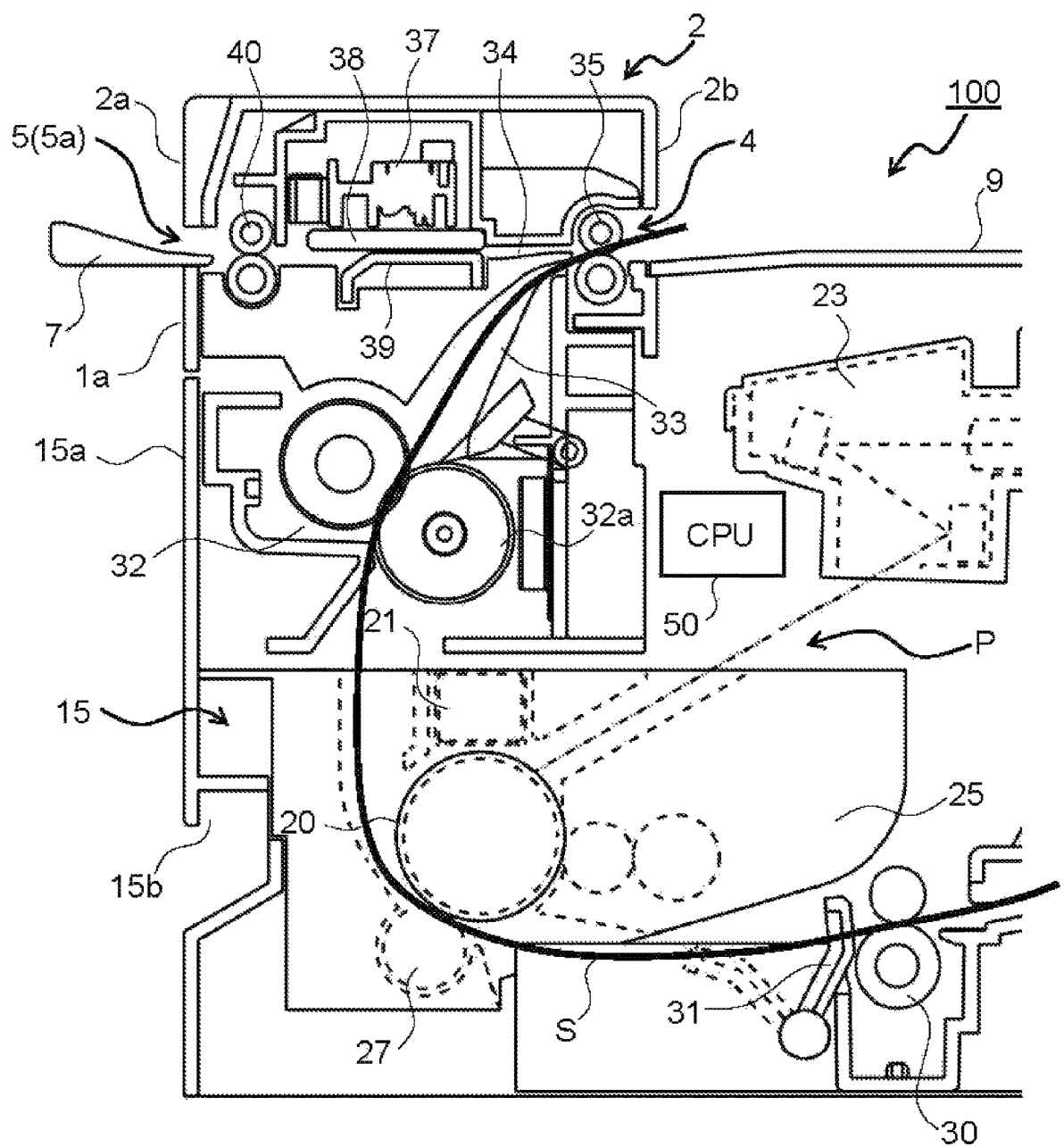
FIG. 5 is a cross-sectional side view of the image forming apparatus of this embodiment, including the image forming unit and the scanner unit, illustrating a situation where an image is being formed on a paper sheet by the image forming unit.

Next, the image forming unit P performs the image forming operation (printing process). FIG. 5 is a diagram showing a situation where the image forming unit P of the image forming apparatus 100 of this embodiment forms an image. Specifically, the surface of the photosensitive drum 20, which is rotated by a motor (not shown) in a clockwise direction, is uniformly charged by the charging device 21. Then, an electrostatic latent image is formed on the photosensitive drum 20 by a laser beam from the exposing device 23 based on the document image data stored in the control unit 50. Then, the developing device 25 allows developer (hereinafter referred to as toner) to adhere to the electrostatic latent image, and hence a toner image is formed.

A paper sheet (recording medium) S is conveyed from the paper feeding part 3 via the registration roller pair 30 to the photosensitive drum 20 on which the toner image is formed as described above, and the transfer roller 27 transfers the toner image formed on the surface of the photosensitive drum 20 onto the paper sheet S. The paper sheet S with the transferred toner image is separated from the photosensitive drum 20 and conveyed to the fixing device 32, in which the toner image is fixed. The paper sheet after passing through the fixing device 32 goes along the paper sheet conveying path 33 and is conveyed to the upper part of the image forming apparatus 100, and the discharge roller pair 35 discharges the paper sheet onto the discharge tray 9 with the auxiliary tray 9a.

Next, a case where the image forming apparatus 100 of this embodiment is used as a scanner is described. First, the openable and closable cover 7 is opened as shown in FIG. 4, the front end of the document D is inserted to the document insertion slot 5a along the upper surface (inner surface) of the openable and closable cover 7. In this state, the scan switch 13 on the operation panel 10 is pressed.

Here, if the scan switch 13 is pressed during the image forming operation (an interruption instruction), the image forming operation is temporarily stopped by a control signal from the control unit 50. If there is the paper sheet S that is being conveyed along the sheet conveying path 33, the image forming operation is stopped after the paper sheet S under conveyance is discharged from the discharge part 4 onto the discharge tray 9.

After that, the feed roller pair 40 rotates based on a control signal from the control unit 50, and the document D is conveyed to the reading glass 38. Then, reading (a scanning process) of the document D is performed in the same manner as in the image forming operation, and the document image data is stored in the storage unit (not shown) in the control unit 50. The stored document image data is sent to a personal computer or the like via the Internet line, a LAN cable, or the like.

According to the above structure, the paper sheet conveying path 33 and the document conveying path 34 join at downstream side ends in the conveying direction, and the common discharge part 4 is disposed at the junction. In this way, the document D after reading by the scanner unit 2 and the paper sheet S after the image formation by the image forming unit P can be discharged onto the discharge tray 9 using the common discharge roller pair 35. Therefore, compared with a structure in which a discharge part for the document D and a discharge part for the paper sheet S are disposed independently of each other, a size of the image forming apparatus 100 including the scanner unit 2 can be reduced in the height direction, so downsizing and compacting of the image forming apparatus 100 can be achieved.

Further, because the paper feeding part 3 and the document feeding part 5 are disposed independently of each other, conveyance of the paper sheet S can be started without waiting for completion of conveyance (reading) of the document D. Therefore waiting time for reading the document D can be shortened, and image formation efficiency can be improved.

Further, if the scan switch 13 is pressed during the image forming operation (an interruption instruction), the image forming operation is temporarily stopped so that reading of the document D can be performed with higher priority. Therefore, in a case where it becomes necessary to read the document D during continuous printing, the reading can be performed with higher priority, and convenience for a user can be improved.

Further, because the document conveying path 34 extends substantially horizontally from the document feeding part 5 to the discharge part 4, even if the document D is a non-flexible sheet such as cardboard, it can be smoothly conveyed. Therefore, when the document D is conveyed, occurrence of a fold, a wrinkle, or jamming of the document D can be effectively prevented. Further, if a nip gap (space) of the feed roller pair 40 disposed in the document feeding part 5 is adjustable, the nip gap of the feed roller pair 40 can be changed in accordance with a thickness of the document D, and the document D can be conveyed more smoothly.

Figure 6:
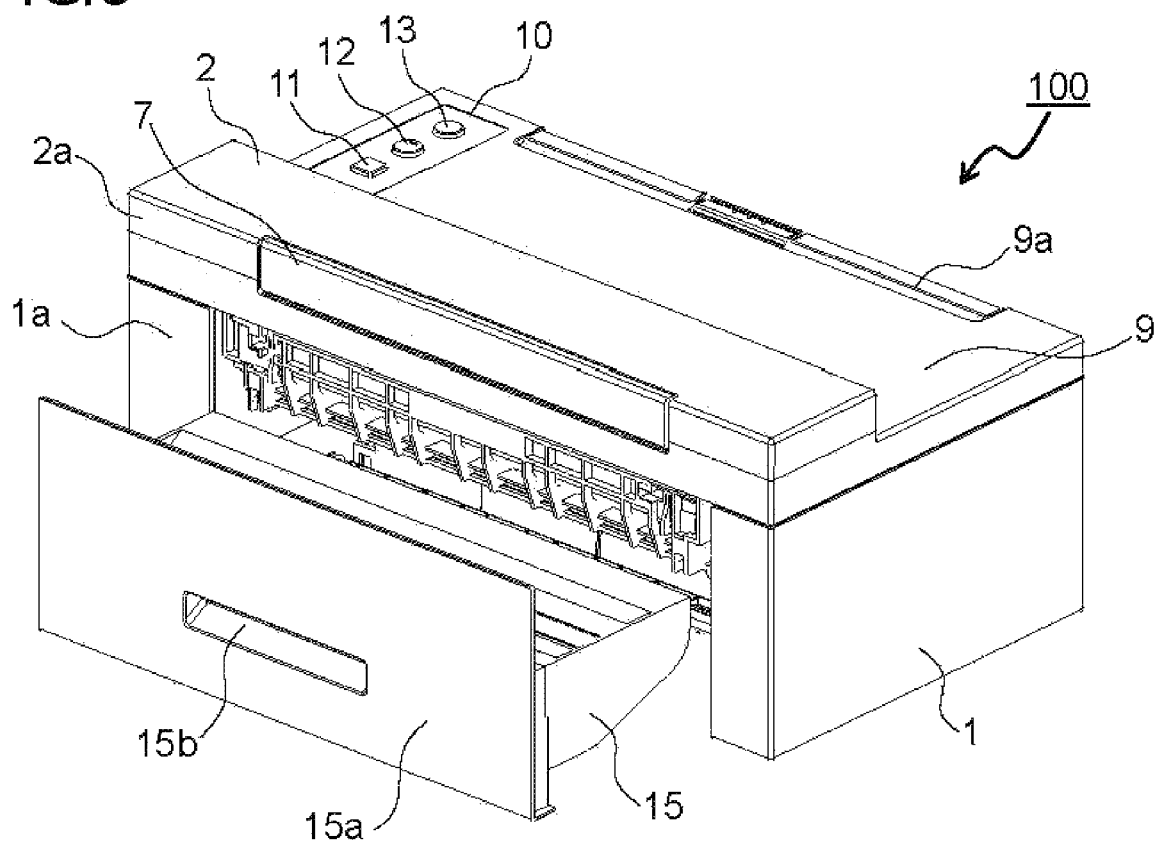
FIG. 6 is an external perspective view of the image forming apparatus of this embodiment, viewed from the back side, which shows a state where process unit is removed.

FIG. 6 is an external perspective view of the image forming apparatus 100 of this embodiment, viewed from the back side, showing a state where the process unit 15 is removed. If jamming of the paper sheet S occurs in the paper sheet conveying path 33, or if it becomes necessary to perform replacement or maintenance of the photosensitive drum 20 or the developing device 25 in the image forming unit P, the process unit 15 is pulled out from the main body 1 by gripping the grip portion 15b. In this way, jam handling, parts replacement, or maintenance work can be performed easily without opening the discharge tray 9 or the like of the main body 1.

Other than that, the present disclosure is not limited to the embodiment described above, but can be modified variously within the scope of the present disclosure without deviating from the spirit thereof. For instance, the above embodiment exemplifies a 1× optical system as the reading method of the reading module 37 of the scanner unit 2, in which the CMOS sensor is used as the image sensor without using a mirror. However, it is also possible to use an optical reduction system in which a plurality of mirrors and an optical lens are used, and a charge coupled device (CCD) is used as the image sensor, so the optical lens forms a reduced image for reading the image.

Further, the above embodiment exemplifies the structure including the sheet feed tray 3a as the paper feeding part 3. However, it is also possible that the paper feeding part 3 includes a sheet feed cassette that can be inserted into and pulled out from the main body 1, instead of the sheet feed tray 3a.

Further, as a matter of course, the present disclosure is not limited to the monochrome copier as illustrated in FIG. 1, but can be applied to other image forming apparatuses having the scanner function, such as a color copier, a digital multifunction peripheral, or a facsimile machine.

The present disclosure can be used for image forming apparatuses having an image reading function for reading a document image. Using the present disclosure, it is possible to provide an image forming apparatus having an image reading function, in which a size of the apparatus can be reduced in the height direction, and a decrease in image forming efficiency can be suppressed.

What is claimed is:
1. An image forming apparatus comprising:
a sheet feeding part for sending out a sheet;

a sheet conveying path extending from the sheet feeding part to a downstream side in a sheet conveying direction;

an image forming unit disposed on the sheet conveying path so as to form an image on the sheet;

a document feeding part disposed at a position different from that of the sheet feeding unit, so as to send out a document;

a document conveying path extending from the document feeding part to a downstream side in the document conveying direction;

an image reading unit disposed on the document conveying path so as to read the document; and a common discharge part disposed at a junction of a downstream side end of the sheet conveying path in the sheet conveying direction and a downstream side end of the document conveying path in the document conveying direction, so as to discharge the sheet with the image formed by the image forming unit and the document after reading by the image reading unit.

2. The image forming apparatus according to claim 1, further comprising:

a main body in which the image forming unit is disposed; and a scanner unit disposed on an upper surface of the main body, the scanner unit including the image reading unit, wherein the main body has a rectangular parallelepiped shape including a first side surface and a second side surface facing each other, the scanner unit has a first side plate located above the first side surface and a second side plate facing the first side plate on the second side surface, the document feeding part is disposed in the first side plate, the sheet feeding part is disposed in the second side surface, the common discharge part is disposed on the upper surface below the second side plate, the document conveying path extends substantially horizontally from the document feeding part to the common discharge part, and the sheet conveying path curves and extends from the sheet feeding part to the common discharge part in a C-shape inside the main body.

3. The image forming apparatus according to claim 2, wherein a discharge tray is disposed on the upper surface of the main body, for receiving the sheet and the document discharged from the common discharge part, and the discharge tray also constitutes a part of the upper surface of the main body.

4. The image forming apparatus according to claim 3, further comprising an auxiliary tray connected to the discharge tray in a slidable manner, the auxiliary tray being selectively positioned at a first position stored in the discharge tray and at a second position protruding from the discharge tray to a downstream side in a discharging direction.

5. The image forming apparatus according to claim 1, further comprising:

a control unit for controlling the sheet feeding part, the image forming unit, the document feeding part, and the image reading unit; and an input unit for inputting an instruction to perform a printing process for forming an image on the sheet or an instruction to perform a scanning process for reading the document, to the control unit, wherein when an interruption instruction to perform the scanning process is input during the printing process on a plurality of sheets fed successively, the control unit stops feeding of the sheets from the sheet feeding part and temporarily stops the printing process so as to perform the scanning process with higher priority.

6. The image forming apparatus according to claim 5, wherein when the interruption instruction for the scanning process is input, if there is a sheet being conveyed on the sheet conveying path, the control unit starts the scanning process after the sheet is discharged to the common discharge part.

7. The image forming apparatus according to claim 5, wherein the input unit includes an operation panel disposed on an upper surface of the main body, for switching between the printing process and the scanning process.

8. The image forming apparatus according to claim 1, wherein a main body has a first side surface on which the document feeding part is disposed at an upper part thereof, and a second side surface on which the sheet feeding part is disposed at a lower part thereof, the second side surface being disposed opposite to the first side surface, the image forming apparatus further comprises a process unit including at least a part of the image forming unit, the process unit being attachable to and detachable from the main body at the first side surface, and the process unit has a unit side surface forming a part of an external surface of the main body together with the first side surface, and a grip portion provided to the unit side surface, the grip portion being gripped while the process unit is attached or detached.

9. The image forming apparatus according to claim 2, the scanner unit further comprising a document insertion slot formed on the first side plate and an openable and closable cover supported in a vertically rotatable manner at a lower end part of the document insertion slot, so as to open or close the document insertion slot, wherein the openable and closable cover works as an insertion guide for inserting the document to the document feeding part, in a state opened outward from the document insertion slot.

* * * * *